UNITED STATES PATENT OFFICE.

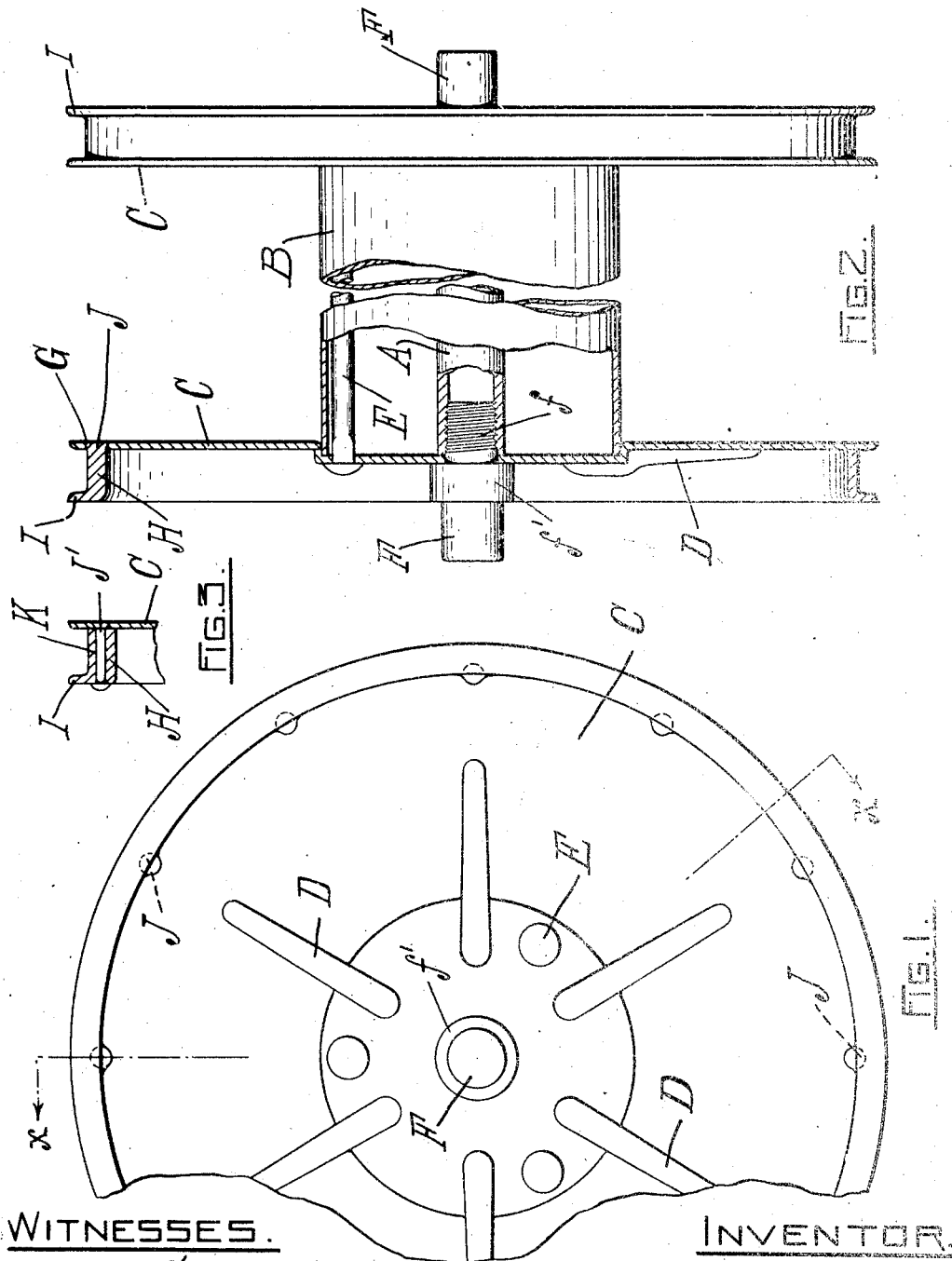

FRANK MOSSBERG, OF ATTLEBORO, MASSACHUSETTS, ASSIGNOR TO FRANK MOSSBERG COMPANY, A CORPORATION OF RHODE ISLAND.

REEL.

962,453.

Specification of Letters Patent.   Patented June 28, 1910.

Application filed July 10, 1909. Serial No. 506,889.

*To all whom it may concern:*

Be it known that I, FRANK MOSSBERG, a citizen of the United States, residing at Attleboro, in the county of Bristol and State of Massachusetts, have invented certain new and useful Improvements in Reels, of which the following is a specification.

My invention relates to reels or beams adapted either for wire or yarn, and its essential purpose is to provide a novel form of belt race which is available when the common integral grooved sheet steel race cannot be used.

My invention consists in applying to the outer face of the reel or beam head a malleable iron ring, and in the novel construction of the ring and its attaching means.

In the accompanying drawings which form a part of this specification, Figure 1 is a partial end elevation of a reel or beam provided with my novel belt race, Fig. 2, a side elevation of the same, with a portion of the intermediate portion of the body broken away, and showing a part in section on line $x$—$x$ of Fig. 1, and Fig. 3, a section of a modified form of my invention.

Like characters of reference indicate like parts throughout the views.

In the present instance my invention is shown in connection with a reel comprising the axial member A, drum B, heads C provided with ribs D, connecting bolts E, and the trunnions F, each provided with a threaded shank $f$ engaging the interior of the member A, and having the collar $f'$ bearing against the exterior face of the head B. The trunnion members assist in uniting the parts of the reel. The heads are composed of sheet metal and are provided near their margins with a series of perforations G.

A belt race is formed which consists of a ring preferably of malleable iron, comprising a flat body portion H provided upon its outer margin with a flange I bent at a right angle to the body H, and having upon its inner margin a series of projections J. The projections are inserted into the openings G and riveted, thus bringing the inner margin of the body H tight against the outer face of the head C at a slight distance from the periphery of the latter.

In Fig. 3, is shown a modification of my invention wherein for the projections J are substituted rivets J' each passing through a longitudinal opening K in the body H of the ring.

By the described method of construction and application, whereby the race may be of any preferred diameter regardless of the diameter of the head, and may be fixed upon the face of the head at any preferred distance from the periphery of the latter, it will be observed that a reel may have any predetermined selected speed by applying thereto a race of the required diameter.

The feature of the reel and its component parts herein shown but not claimed are not hereby abandoned, but constitute the subject matter of a patent application to be later filed by this applicant.

What I claim is,—

1. In a reel or beam, the combination of a head provided with marginal openings, of a belt race comprising a cylindrical body provided with an outwardly extending flange upon one end, and projections upon its opposite end, said projections entering the openings and adapted to be riveted therein.

2. In a reel or beam, the combination of a head provided with an annular series of openings at a distance from the periphery of the head, a belt race, and projections upon the belt race fixed in the openings.

In testimony whereof I have affixed my signature in presence of two witnesses.

FRANK MOSSBERG.

Witnesses:
  WALTER LOUIS FROST,
  HORATIO E. BELLOWS.